US012300085B2

(12) United States Patent
Tanishita et al.

(10) Patent No.: US 12,300,085 B2
(45) Date of Patent: May 13, 2025

(54) OVERBOARD FALL DETECTION UNIT, PORTABLE TERMINAL, AND SERVER DEVICE

(71) Applicant: JAPAN RADIO CO., LTD, Tokyo (JP)

(72) Inventors: Tomoki Tanishita, Tokyo (JP); Nobuhisa Murata, Tokyo (JP); Juichi Suzuki, Tokyo (JP); Taisei Kumazawa, Tokyo (JP)

(73) Assignee: JAPAN RADIO CO., LTD., Tokyo (JP)

( * ) Notice: Subject to any disclaimer, the term of this patent is extended or adjusted under 35 U.S.C. 154(b) by 2 days.

(21) Appl. No.: 18/261,347

(22) PCT Filed: Jan. 31, 2022

(86) PCT No.: PCT/JP2022/003510
§ 371 (c)(1),
(2) Date: Jul. 13, 2023

(87) PCT Pub. No.: WO2022/168772
PCT Pub. Date: Aug. 11, 2022

(65) Prior Publication Data

US 2024/0078888 A1 Mar. 7, 2024

(30) Foreign Application Priority Data

Feb. 3, 2021 (JP) ................................ 2021-015847

(51) Int. Cl.
*G08B 21/08* (2006.01)
*B63C 9/00* (2006.01)

(52) U.S. Cl.
CPC .......... *G08B 21/088* (2013.01); *B63C 9/0005* (2013.01)

(58) Field of Classification Search
CPC ............................ G08B 21/088; B63C 9/0005
See application file for complete search history.

(56) References Cited

U.S. PATENT DOCUMENTS

| | | | |
|---|---|---|---|
| 2002/0052159 | A1 | 5/2002 | Eguchi |
| 2020/0036056 | A1 | 1/2020 | Thomas et al. |
| 2020/0388136 | A1 | 12/2020 | Kurata |

FOREIGN PATENT DOCUMENTS

| | | | |
|---|---|---|---|
| AU | 2014100827 A4 | | 8/2014 |
| JP | H1111396 A | * | 6/1997 |

(Continued)

OTHER PUBLICATIONS

Masaaki Wada, "Development and Evaluation of a Rescue Support System for People Who Fall Overboard at Sea", Information Processing Society of Japan Research Report Ubiquitous Computing Systems (UBI), Information Processing Society of Japan, 2006, vol. 54, 2006-UBI-011, pp. 31 to 38.

(Continued)

*Primary Examiner* — Curtis A Kuntz
*Assistant Examiner* — James E Munion
(74) *Attorney, Agent, or Firm* — Ohlandt, Greeley and Perle, L.L.P.

(57) ABSTRACT

An overboard fall detection unit including: a water environment sensor that is equipped on a ship crewperson and that outputs water environment data around the ship crewperson; an overboard fall detection part that detects an overboard fall of the ship crewperson on the basis of the water environment data; and an overboard fall notification part that transmits a beacon signal that continuously notifies of overboard fall information related to the ship crewperson via one-way communication.

6 Claims, 13 Drawing Sheets

(56) References Cited

FOREIGN PATENT DOCUMENTS

| | | | | | |
|---|---|---|---|---|---|
| JP | 2004249956 A | * | 9/2004 | | |
| JP | 2007-293384 A | | 11/2007 | | |
| JP | 3195991 U | * | 2/2015 | ........... | B63C 9/0005 |
| JP | 2020-196402 A | | 12/2020 | | |
| JP | 2002-232303 A | | 8/2022 | | |

OTHER PUBLICATIONS

International Search Report dated Apr. 12, 2022 for PCT Appl. No. PCT/JP2022/003510.

Extended European Search Report dated Dec. 10, 2024 for European Application No. 22749644.5.

* cited by examiner

OVERBOARD FALL DETECTION UNIT, PORTABLE TERMINAL, AND SERVER DEVICE

TECHNICAL FIELD

The present disclosure relates to a technique of detecting an overboard fall of a ship crewperson.

BACKGROUND

Techniques for detecting an overboard fall of a ship crewperson are disclosed in Patent Document 1, Non-Patent Document 1, and the like. In Patent Document 1, as illustrated in FIG. 1, an overboard fall of a ship crewperson C is detected based on the inability to communicate with a wireless tag R equipped on the ship crewperson C. In Non-Patent Document 1, as illustrated in FIG. 2, an overboard fall of a ship crewperson C is detected based on wetness of a portable terminal P equipped on the ship crewperson C.

PATENT LITERATURE

Patent Document 1: JP 2007-293384 A

NON-PATENT LITERATURE

Non-Patent Document 1: Masaaki Wada, "Development and Evaluation of a Rescue Support System for People Who Fall Overboard at Sea", Information Processing Society of Japan Research Report Ubiquitous Computing Systems (UBI), Information Processing Society of Japan, 2006, Vol. 54, 2006-UBI-011, pp. 31 to 38

SUMMARY

Technical Problem

According to Patent Document 1, when a ship crewperson C falls overboard, the overboard fall of the ship crewperson C is detected based on the inability to communicate with a wireless tag R. However, when the ship crewperson C resurfaces, there is a possibility that detection of the overboard fall of the ship crewperson C will be canceled based on the ability to communicate with the wireless tag R. Therefore, there is a possibility that the ship crewperson C may not be rescued.

According to Non-Patent Document 1, when a ship crewperson C falls overboard, the overboard fall of the ship crewperson C is detected based on wetness of a portable terminal P; however, a pairing establishment of the portable terminal P is canceled due to communication failure of the portable terminal P. When the ship crewperson C resurfaces, regardless of the fact that the portable terminal P is able to communicate, there is a possibility that a non-overboard fall of the ship crewperson C may be detected due to non-wetness of the portable terminal P, and thus establishment pairing of the portable terminal P will not be executed. Therefore, there is a possibility that the ship crewperson C may not be rescued. Here, pairing is achieved by two-way communication by performing registration and authentication between mutual devices.

Therefore, in order to solve the above problems, an object according to the present disclosure is to maintain detection of an overboard fall of a ship crewperson and ensure notification of the overboard fall of the ship crewperson when the ship crewperson resurfaces after the overboard fall.

Solution to Problem

In order to solve the above-mentioned problems, after detecting an overboard fall of a ship crewperson based on water environment data around the ship crewperson, a beacon signal is transmitted to continuously notify of overboard fall information related to the ship crewperson via one-way communication.

Specifically, an aspect according to the present disclosure is an overboard fall detection unit including: a water environment sensor equipped on a ship crewperson and configured to output water environment data around the ship crewperson; an overboard fall detection part configured to detect an overboard fall of the ship crewperson based on the water environment data; and an overboard fall notification part configured to transmit a beacon signal that continuously notifies of overboard fall information related to the ship crewperson via one-way communication.

With this configuration, the beacon signal does not require pairing establishment, and is not interrupted even when the ship crewperson has fallen overboard, and is continuously transmitted when the ship crewperson resurfaces after falling overboard. Therefore, it is possible to reliably notify of the overboard fall of the ship crewperson when the ship crewperson resurfaces after falling overboard.

In addition, an aspect according the present disclosure is the overboard fall detection unit, further including an overboard fall storage part configured to write the overboard fall information related to the ship crewperson to a memory, and to continuously write the overboard fall information related to the ship crewperson to the memory regardless of whether or not the ship crewperson has resurfaced after the overboard fall; wherein the overboard fall notification part transmits the beacon signal notifying of the overboard fall information related to the ship crewperson based on the overboard fall information related to the ship crewperson that is continuously written to the memory.

With this configuration, even when detection of the overboard fall of the ship crewperson is canceled when the ship crewperson resurfaces after falling overboard, the overboard fall information related to the ship crewperson is maintained in the memory even when the ship crewperson resurfaces after falling overboard. Therefore, it is possible to maintain the detection of the overboard fall of the ship crewperson when the ship crewperson resurfaces after falling overboard.

Moreover, another aspect according to the present disclosure is the overboard fall detection unit, wherein the overboard fall detection part detects the overboard fall of the ship crewperson definitively and not provisionally, based on a state of the overboard fall of the ship crewperson being detected continuously for a predetermined time or more.

With this configuration, it is possible to prevent erroneous detection of the overboard fall of the ship crewperson by simply detecting temporary wetness of the overboard fall detection unit due to wetness of the ship crewperson on the deck or the like.

In addition, another aspect according to the present disclosure is a portable terminal configured to relay and notify of the overboard fall information related to the ship crewperson when the overboard fall information related to the ship crewperson is acquired from the overboard fall detection unit described above.

With this configuration, by using a portable terminal in a vicinity of the ship crewperson who has fallen overboard, the base or family of the ship crewperson who has fallen overboard and ships in the vicinity of the ship crewperson who has fallen overboard may be notified of the overboard fall information related to the ship crewperson via a server device described later.

Further, another aspect according to the present disclosure is the portable terminal configured to notify of the portable terminal's own position as an overboard fall position of the ship crewperson when the overboard fall information related to the ship crewperson is acquired from the overboard fall detection unit.

With this configuration, by using a portable terminal in a vicinity of the ship crewperson who has fallen overboard, the base or family of the ship crewperson who has fallen overboard and ships in the vicinity of the ship crewperson who has fallen overboard may be notified of the overboard fall position of the ship crewperson via a server device described later.

In addition, another aspect according to the present disclosure is a server device configured to relay and notify a pre-registered terminal of the overboard fall information related to the ship crewperson when the overboard fall information related to the ship crewperson is acquired from the portable terminal described above.

With this configuration, by using the server device, the base or family of the ship crewperson who has fallen overboard and ships in the vicinity of the ship crewperson who has fallen overboard may be notified of the overboard fall information related to the ship crewperson via the portable terminal in the vicinity of the ship crewperson who has fallen overboard.

Further, another aspect according to the present disclosure is the server device configured to relay and notify the pre-registered terminal of the overboard fall position of the ship crewperson when the overboard fall position of the ship crewperson is acquired from the portable terminal described above, and to notify the pre-registered terminal of the overboard fall position of the ship crewperson estimated based on wind speed or tidal current when the overboard fall position of the ship crewperson is not possible to be acquired from the portable terminal.

With this configuration, by using the server device, the base or family of the ship crewperson who has fallen overboard and ships in the vicinity of the ship crewperson who has fallen overboard may be notified of the overboard fall position of the ship crewperson via the portable terminal in the vicinity of the ship crewperson who has fallen overboard. Even when the portable terminal position measurement process fails by the portable terminal in the vicinity of the ship crewperson who has fallen overboard, the overboard fall position of the ship crewperson can be notified of using a portable terminal position estimation process by the server device.

Advantageous Effects of the Disclosure

Thus, with the technique according to the present disclosure, it is possible to maintain detection of an overboard fall of a ship crewperson and ensure notification of the overboard fall of the ship crewperson when the ship crewperson resurfaces after the overboard fall.

DESCRIPTION OF EMBODIMENTS

Embodiments according to the present disclosure will be described with reference to the accompanying drawings. The embodiments described below are examples of implementing the techniques according to the present disclosure, and the techniques according to the present disclosure are not limited to the following embodiments.

Figure 1:
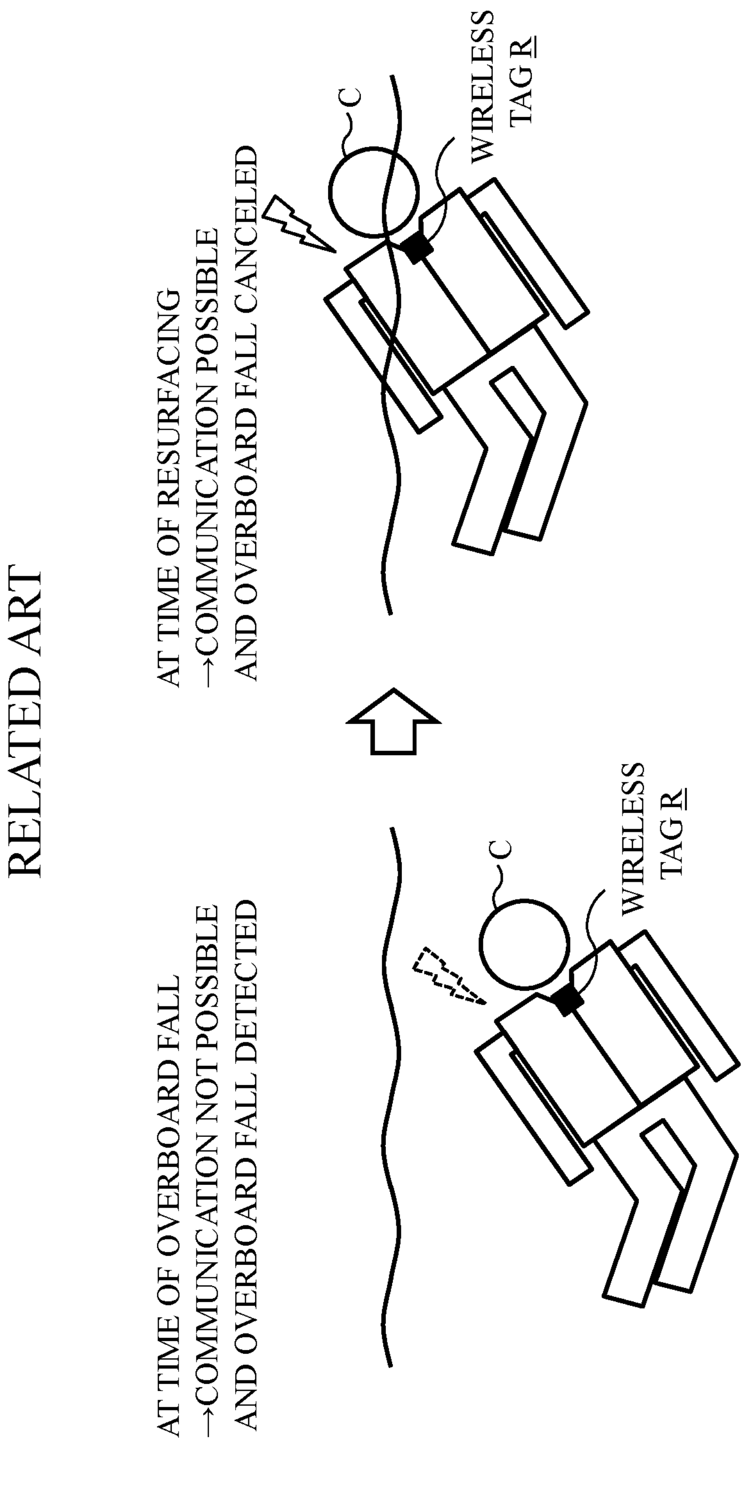
FIG. 1 is a diagram illustrating a first known technique of an overboard fall detection process.
Figure 2:
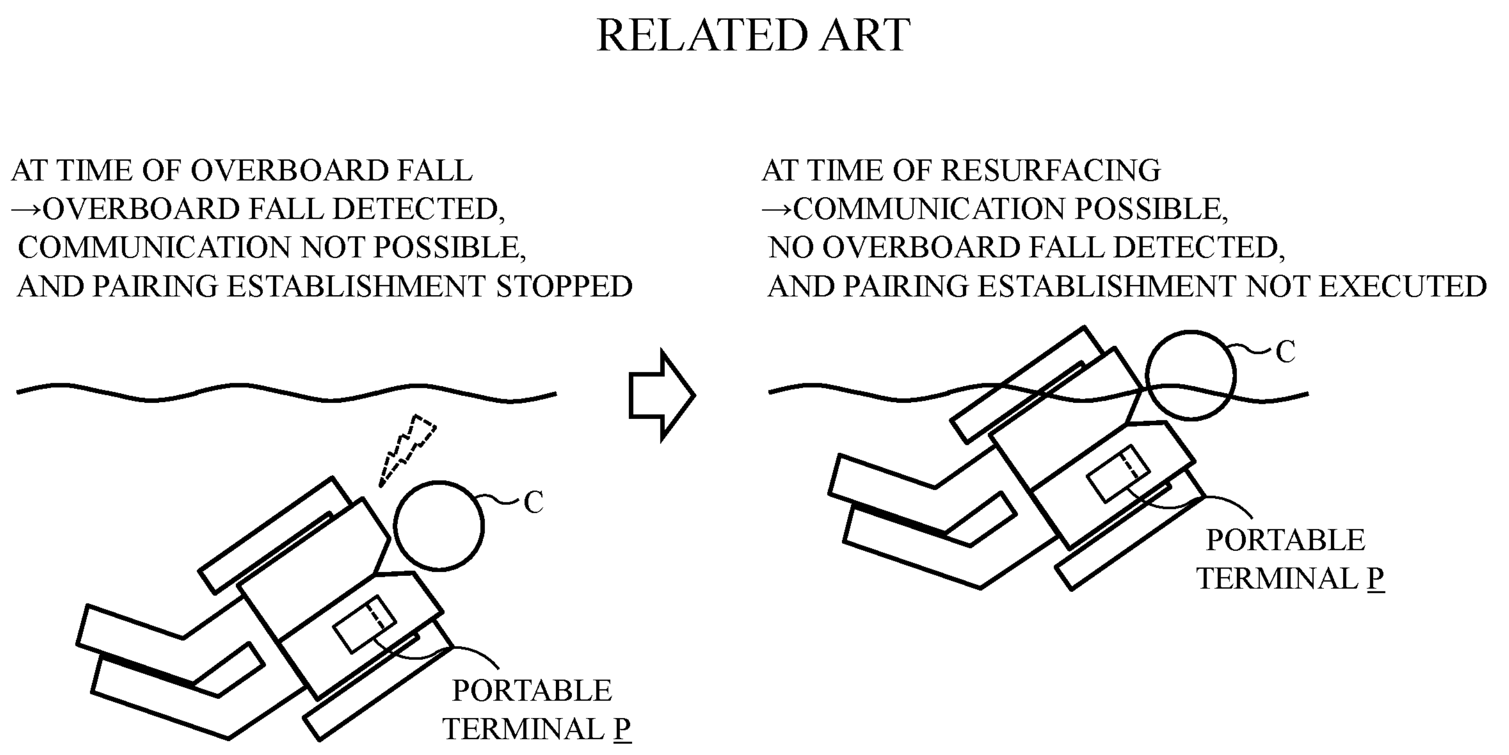
FIG. 2 is a diagram illustrating a second known technique of an overboard fall detection process.
Figure 3:
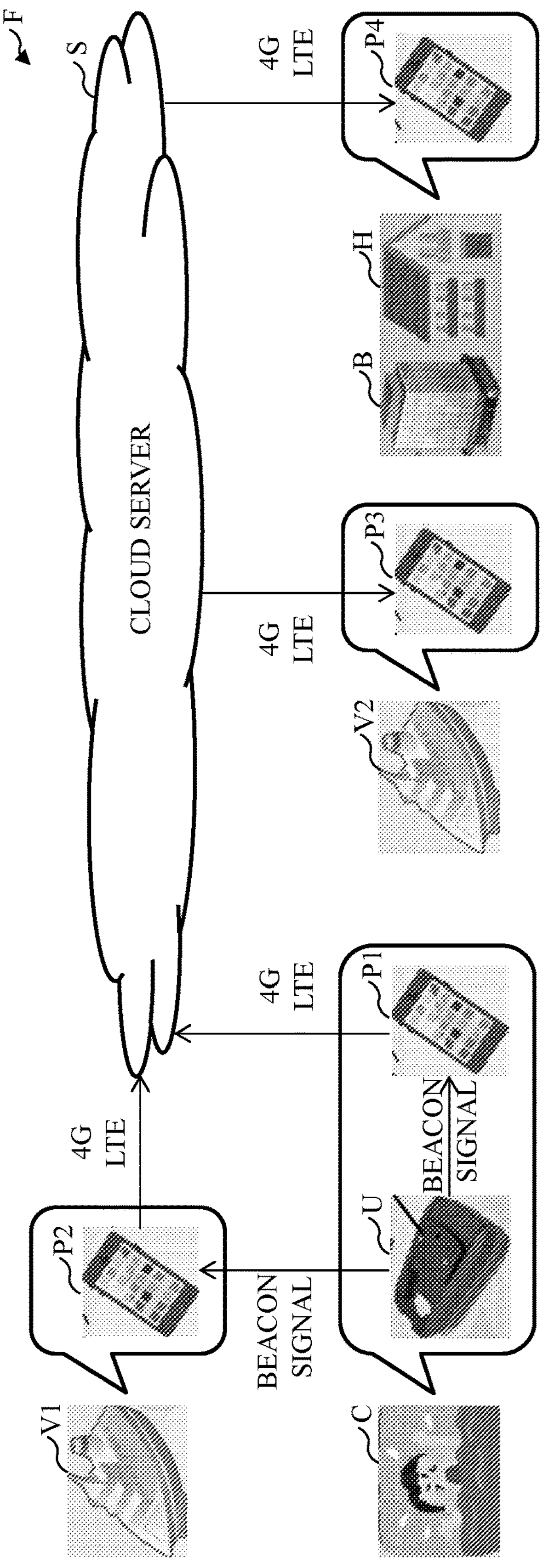
FIG. 3 is a diagram illustrating a configuration of an overboard fall detection system according to the present disclosure.

FIG. 3 illustrates a configuration of an overboard fall detection system according to the present disclosure. The overboard fall detection system F includes an overboard fall detection unit U and a portable terminal P1 possessed by a ship crewperson C, a portable terminal P2 possessed by a ship crewperson of a ship V1 on which the ship crewperson C boards, a cloud server S, a portable terminal P3 possessed by a ship crewperson of a ship V2 in the vicinity of the ship crewperson C, and a portable terminal P4 possessed by an employee at a base B of the ship crewperson C or possessed by a family member at home H of the ship crewperson C.

Figure 4:
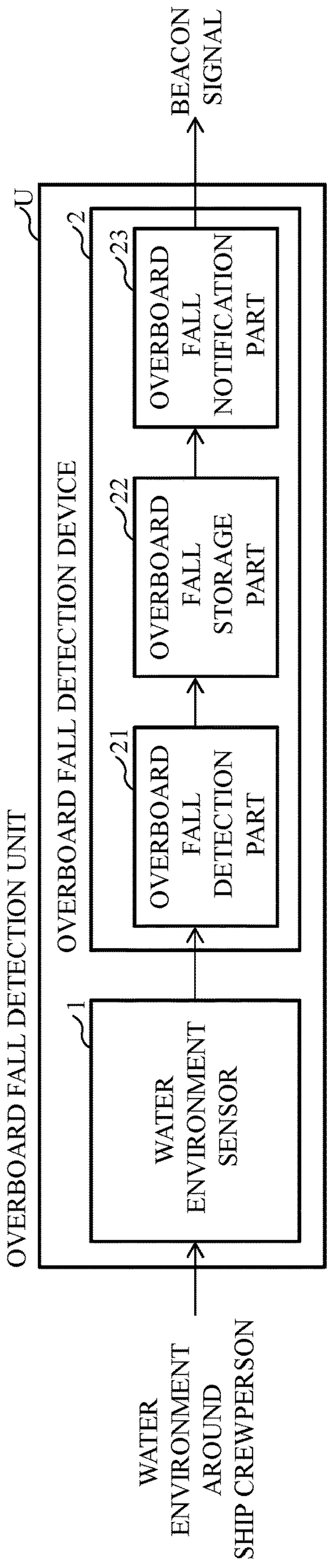
FIG. 4 is a diagram illustrating a configuration of an overboard fall detection unit according to the present disclosure.

FIG. 4 illustrates a configuration of an overboard fall detection unit according to the present disclosure. The overboard fall detection unit U includes a water environment sensor 1 and an overboard fall detection device 2. The overboard fall detection device 2 includes an overboard fall detection part 21, an overboard fall storage part 22, and an overboard fall notification part 23, and is installed with an overboard fall detection program illustrated in FIGS. 5 and 6. The overboard fall detection unit U is installed at a neck portion of a life jacket of the ship crewperson C, and a portable terminal P1 is installed and waterproofed in a breast pocket of the life jacket of the ship crewperson C (see FIGS. 7 to 9).

Figure 5:
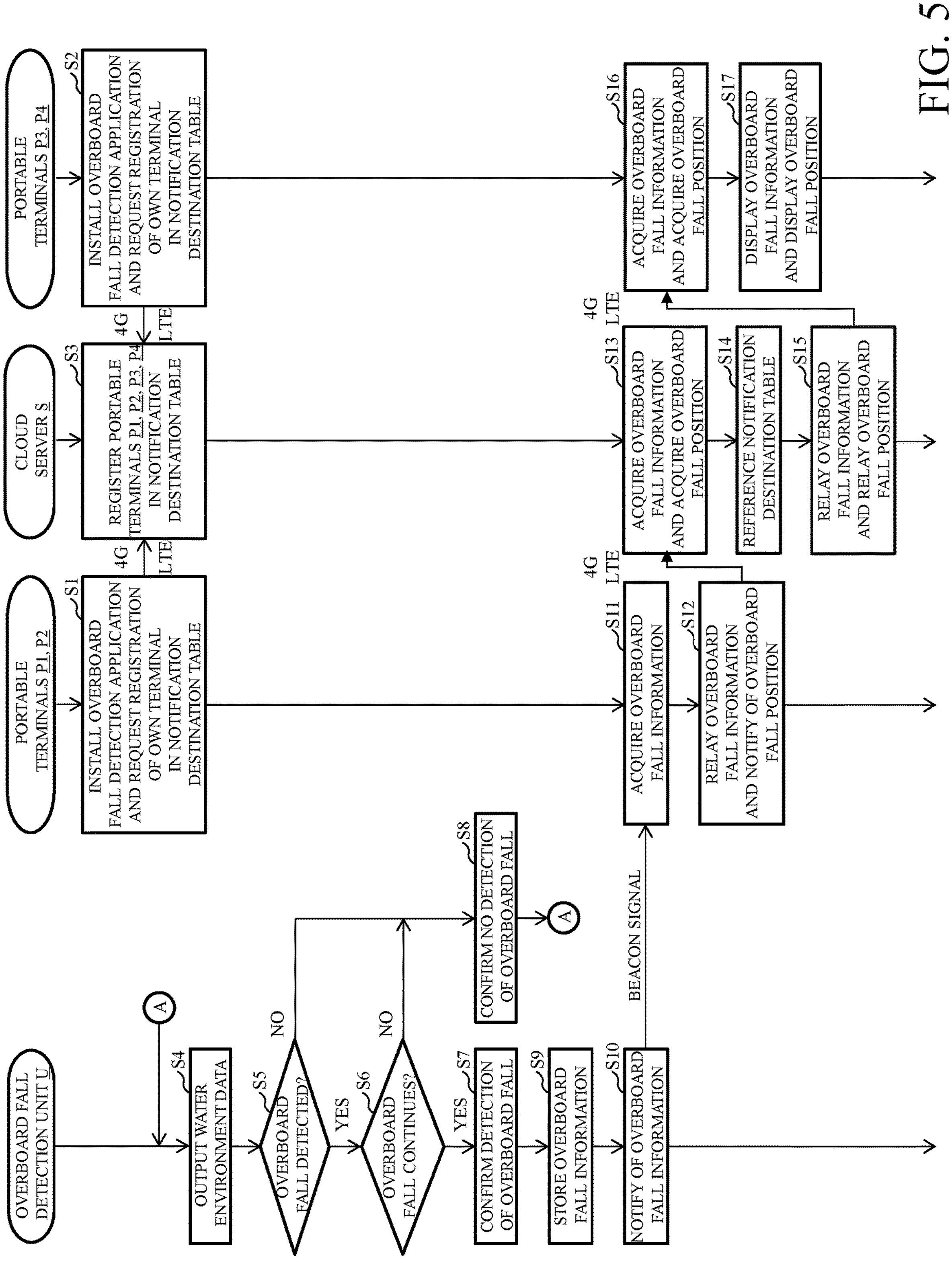
FIG. 5 is a diagram illustrating processing of an overboard fall detection system according to the present disclosure.
Figure 6:
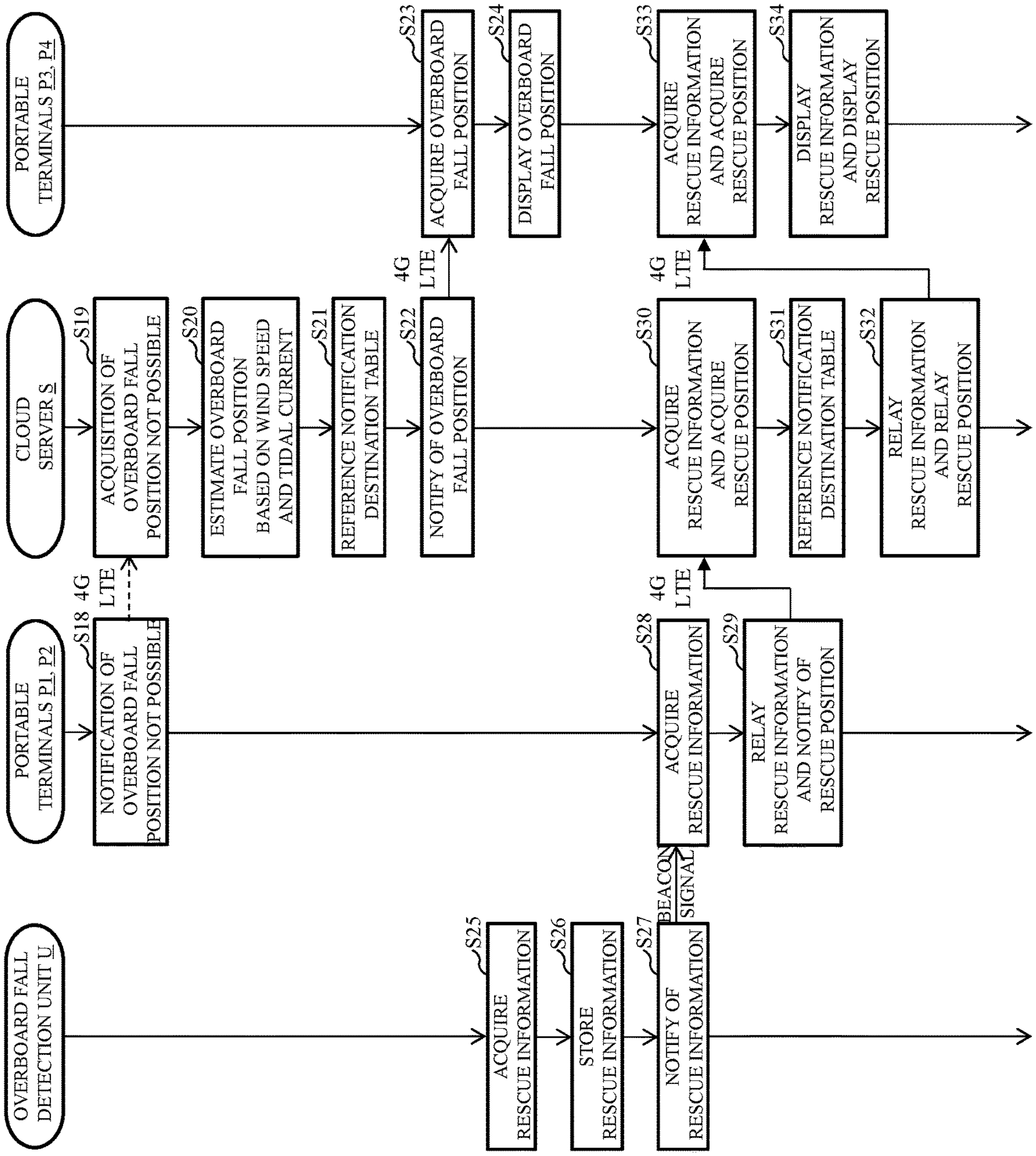
FIG. 6 is a diagram illustrating processing of an overboard fall detection system according to the present disclosure.

FIGS. 5 and 6 illustrate processing of the overboard fall detection system according to the present disclosure. After being installed with an overboard fall detection application as illustrated in FIGS. 5 and 6, portable terminals P1, P2, P3, and P4 use 4th Generation (4G) or Long Term Evolution (LTE) to request a cloud server S to register their own terminals in a notification destination table (steps S1 and S2). The cloud server S registers the portable terminals P1, P2, P3, and P4 in the notification destination table (step S3).

Figure 7:
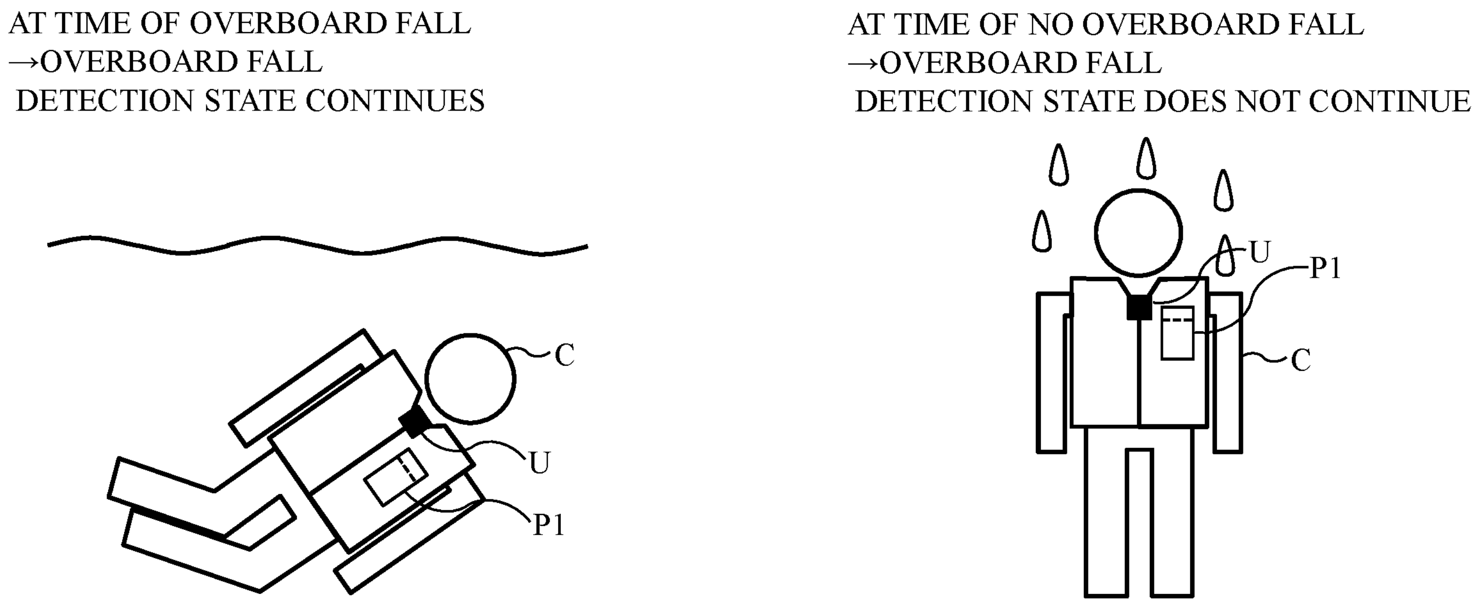
FIG. 7 is a diagram illustrating an overboard fall detection process according to the present disclosure.

FIG. 7 illustrates an overboard fall detection process according to the present disclosure. The water environment sensor 1 outputs water environment data around the ship crewperson C (step S4). In a case where the water environment sensor 1 is a wetness sensor, wetness of the water environment sensor 1 is detected when water intervenes between two contacts on a circuit and the two contacts are energized, or when water intervenes in an optical path from a light-emitting part to a light-receiving part, and an amplitude of light from the light-emitting part to the light-receiving part decreases. In a case where the water environment sensor 1 is a water pressure sensor, wetness of the water environment sensor 1 is detected when a high water pressure value is detected. In a case where the water environment sensor 1 is a humidity sensor, wetness of the water environment sensor 1 is detected when a high humidity value is detected.

The overboard fall detection part 21 detects an overboard fall of the ship crewperson C based on the water environment data (step S5). The overboard fall detection part 21 detects definitively and not provisionally an overboard fall of the ship crewperson C (step S7, left column in FIG. 7) based on the fact that a state in which detection of the overboard fall of the ship crewperson C continues for a predetermined period of time or more (YES in step S5, YES in step S6).

On the other hand, the overboard fall detection part 21 detects definitively and not provisionally a non-overboard fall of the ship crewperson C (step S8, right column in FIG. 7) based on the fact that a state in which detection of the overboard fall of the ship crewperson C does not continue for a predetermined period of time or more (YES in step S5, NO in step S6). Here, the predetermined time is about the time required for the water environment sensor 1 to dry after temporarily being wet.

Note that, when the overboard fall detection part 21 has not detected an overboard fall of the ship crewperson C (NO in step S5), the process is repeated from step S4 after going through step S8.

In this way, it is possible to prevent erroneous detection of an overboard fall of the ship crewperson C by simply detecting temporary wetness of the overboard fall detection unit U due to wetness of the ship crewperson C on the deck or the like.

Figure 8:
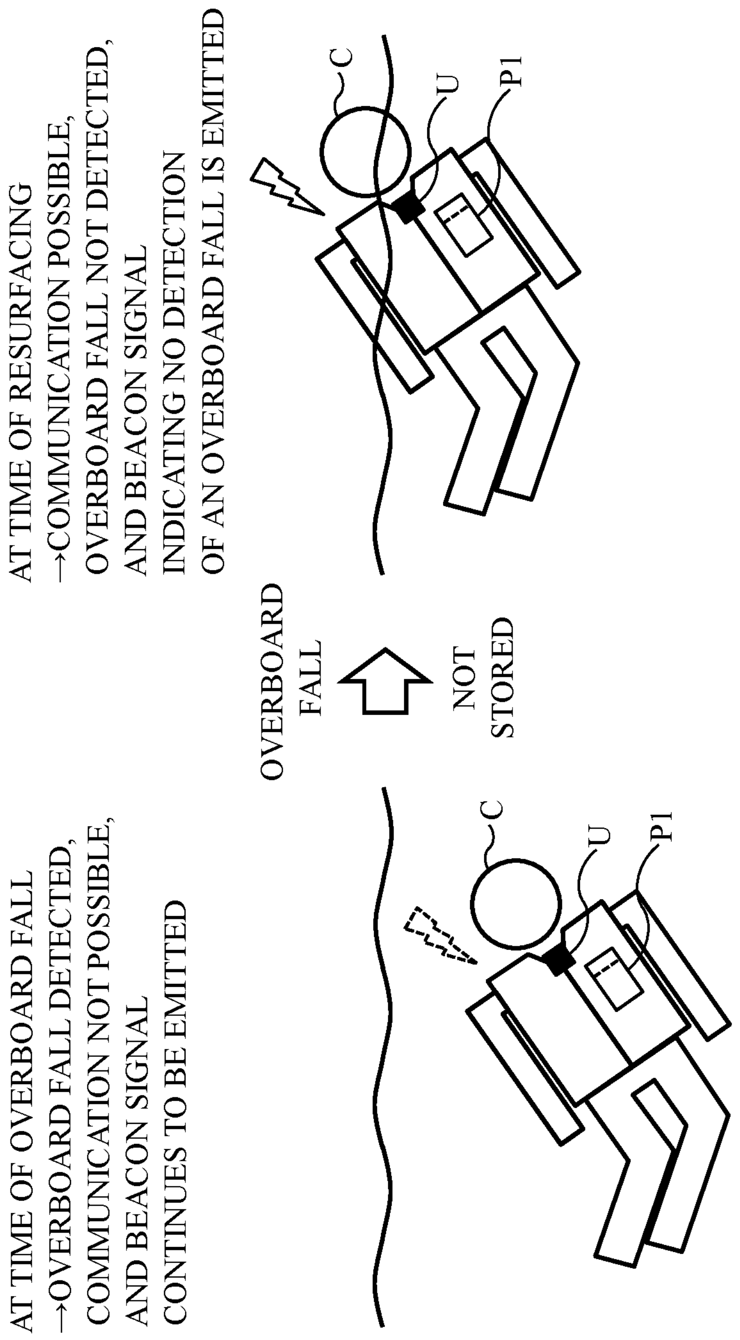
FIG. 8 is a diagram illustrating a first overboard fall notification process according to the present disclosure.
Figure 9:
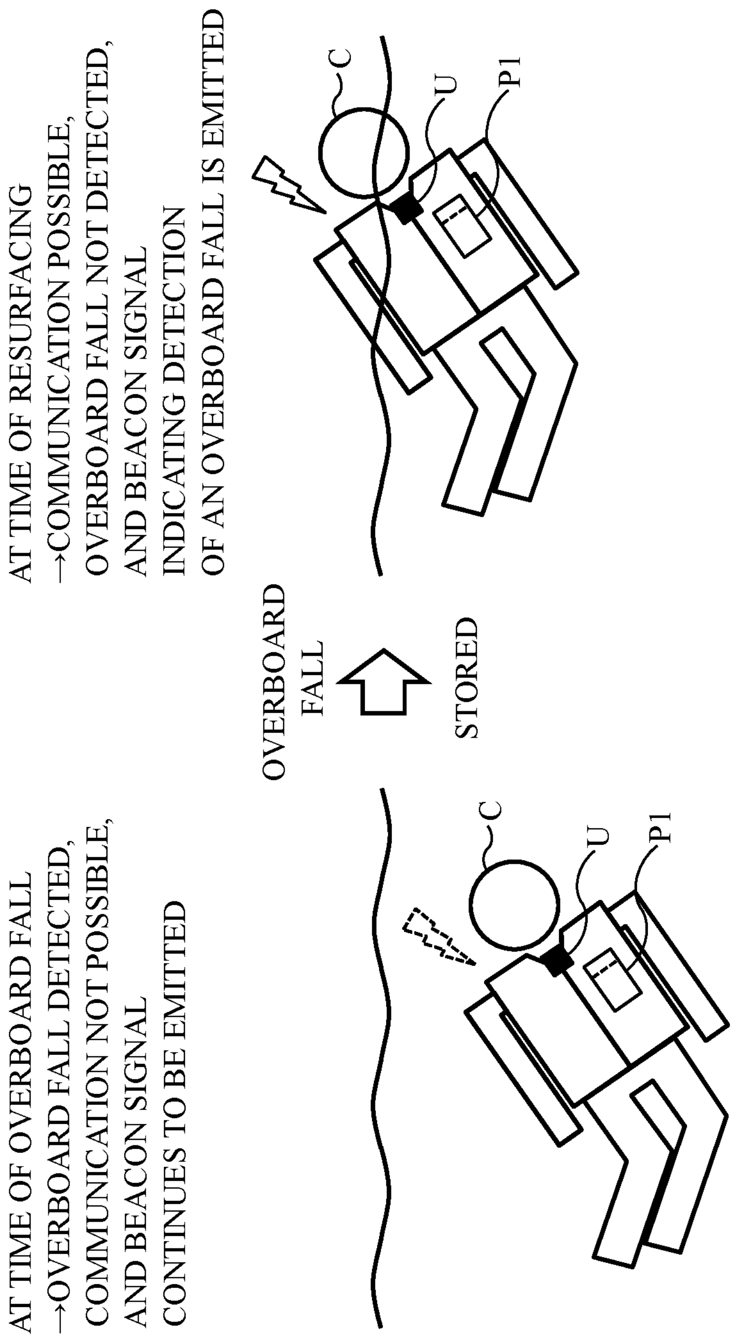
FIG. 9 is a diagram illustrating a second overboard fall notification process according to the present disclosure.

FIGS. 8 and 9 illustrate first and second overboard fall notification processes according to the present disclosure. In a second overboard fall notification process according to the present disclosure, unlike in the first overboard fall notification process according to the present disclosure, the overboard fall storage part 22 writes overboard fall information related to the ship crewperson C into a memory, and continuously writes the overboard fall information related to the ship crewperson C to the memory regardless of whether or not the ship crewperson C has resurfaced after the overboard fall (step S9). In the second overboard fall notification process according to the present disclosure, unlike in the first overboard fall notification process according to the present disclosure, the overboard fall notification part 23 transmits a beacon signal that continuously notifies, by one-way communication, the overboard fall information related to the ship crewperson C (step S10), based on continuous writing to the memory of the overboard fall information related to the ship crewperson C (step S9). In the following, after describing the disadvantages of the first overboard fall notification process according to the present disclosure in which overboard fall information is not written to memory, the advantages of the second overboard fall notification process according to the present disclosure in which overboard fall information is written to memory will be described.

In the first overboard fall notification process according to the present disclosure illustrated in FIG. 8, when there is an overboard fall of the ship crewperson C, the overboard fall of the ship crewperson C is detected based on the water environment data (step S7), and the beacon signal transmission by the overboard fall detection unit U is continued regardless of any communication failure between the overboard fall detection unit U and the portable terminals P1 and P2. When the ship crewperson C resurfaces, regardless of the fact that communication is possible between the overboard fall detection unit U and the portable terminals P1 and P2, there is a possibility that a non-overboard fall of the ship crewperson C will be detected based on the water environment data (step S8), and the non-overboard fall information related to the ship crewperson C will be transmitted by a beacon signal. This is because the overboard fall information related to the ship crewperson C is not written to the memory. Therefore, there is a possibility that the ship crewperson C may not be rescued.

In the second overboard fall notification process according to the present disclosure illustrated in FIG. 9, when there is an overboard fall of the ship crewperson C, the overboard fall of the ship crewperson C is detected based on the water environment data (step S7), and the beacon signal transmission by the overboard fall detection unit U is continued regardless of any communication failure between the overboard fall detection unit U and the portable terminals P1 and P2. When the ship crewperson C resurfaces, communication between the overboard fall detection unit U and the portable terminals P1 and P2 becomes possible, and thus, a non-overboard fall of the ship crewperson C is detected based on the water environment data (step S8); however, the overboard fall information related to the ship crewperson C is transmitted by beacon signal. This is because the overboard fall information related to the ship crewperson C is written into the memory regardless of whether or not the ship crewperson C has resurfaced. Therefore, there is a high possibility that the ship crewperson C will be rescued.

Thus, in both the first overboard fall notification process according to the present disclosure illustrated in FIG. 8 and the second overboard fall notification process according to the present disclosure illustrated in FIG. 9, the beacon signal does not require pairing establishment, and is not interrupted even when there is an overboard fall of the ship crewperson C, and is continuously transmitted when the ship crewperson C resurfaces after the overboard fall. Therefore, notification of the overboard fall of the ship crewperson C may be reliably performed when the ship crewperson C resurfaces after the overboard fall.

In the second overboard fall notification process according to the present disclosure illustrated in FIG. 9, unlike in the first overboard fall notification process according to the present disclosure illustrated in FIG. 8, even in a case where the detection of the overboard fall of the ship crewperson C is canceled when the ship crewperson C has resurfaced after the overboard fall, the overboard fall information related to the ship crewperson C is maintained in the memory even when the ship crewperson C resurfaces after the overboard fall. Therefore, the detection of the overboard fall of the ship crewperson C can be maintained when the ship crewperson C resurfaces after the overboard fall.

Figure 10:
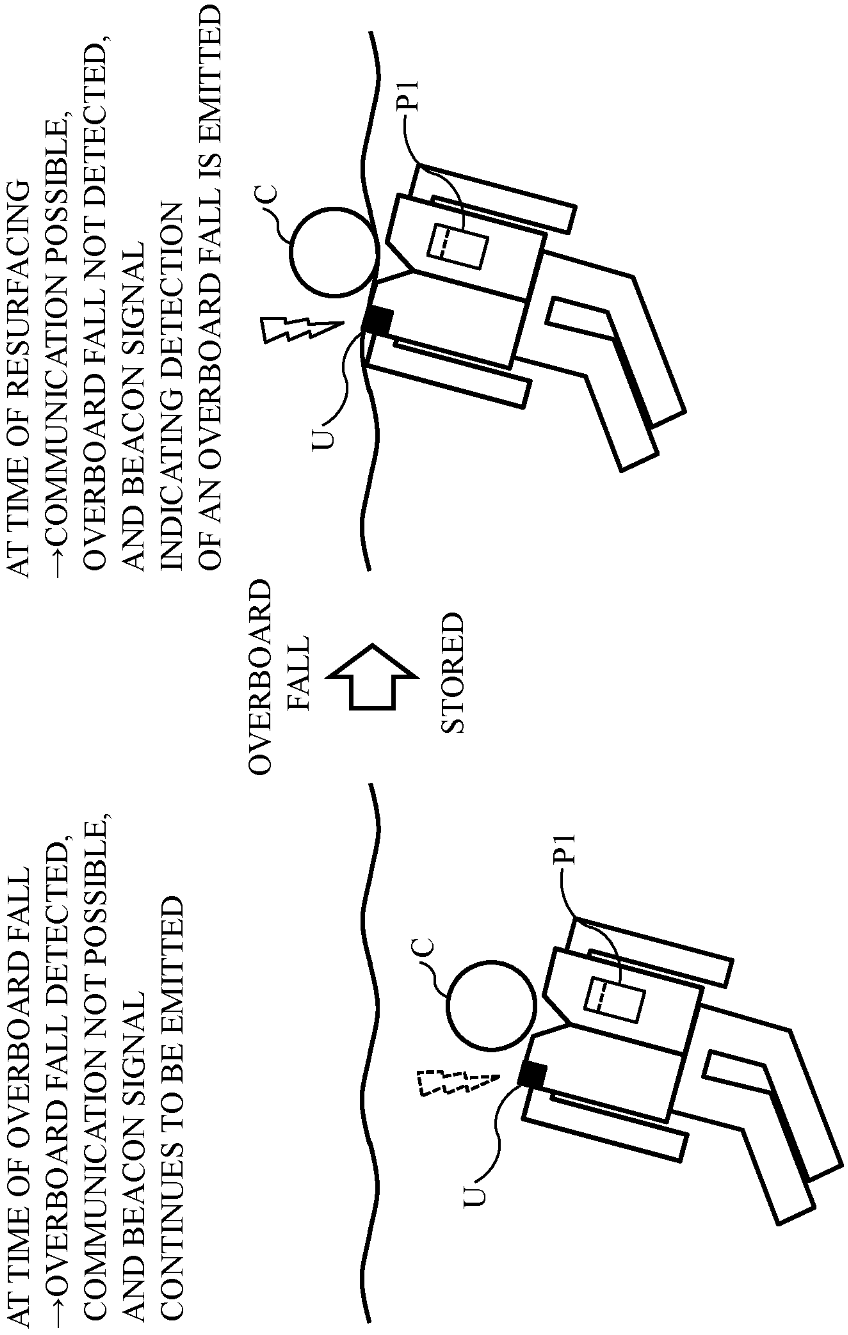
FIG. 10 is a diagram illustrating a modification of an overboard fall notification process.

In the first overboard fall notification process according to the present disclosure illustrated in FIG. 8 and the second overboard fall notification process according to the present disclosure illustrated in FIG. 9, the overboard fall detection unit U is equipped at the neck portion of the life jacket of the ship crewperson C. As a modification illustrated in FIG. 10, the overboard fall detection unit U is preferably installed at a location that is high on the body such as a shoulder portion of the life jacket of the ship crewperson C, or at a location that is likely to be exposed to the air after resurfacing.

Figure 11:
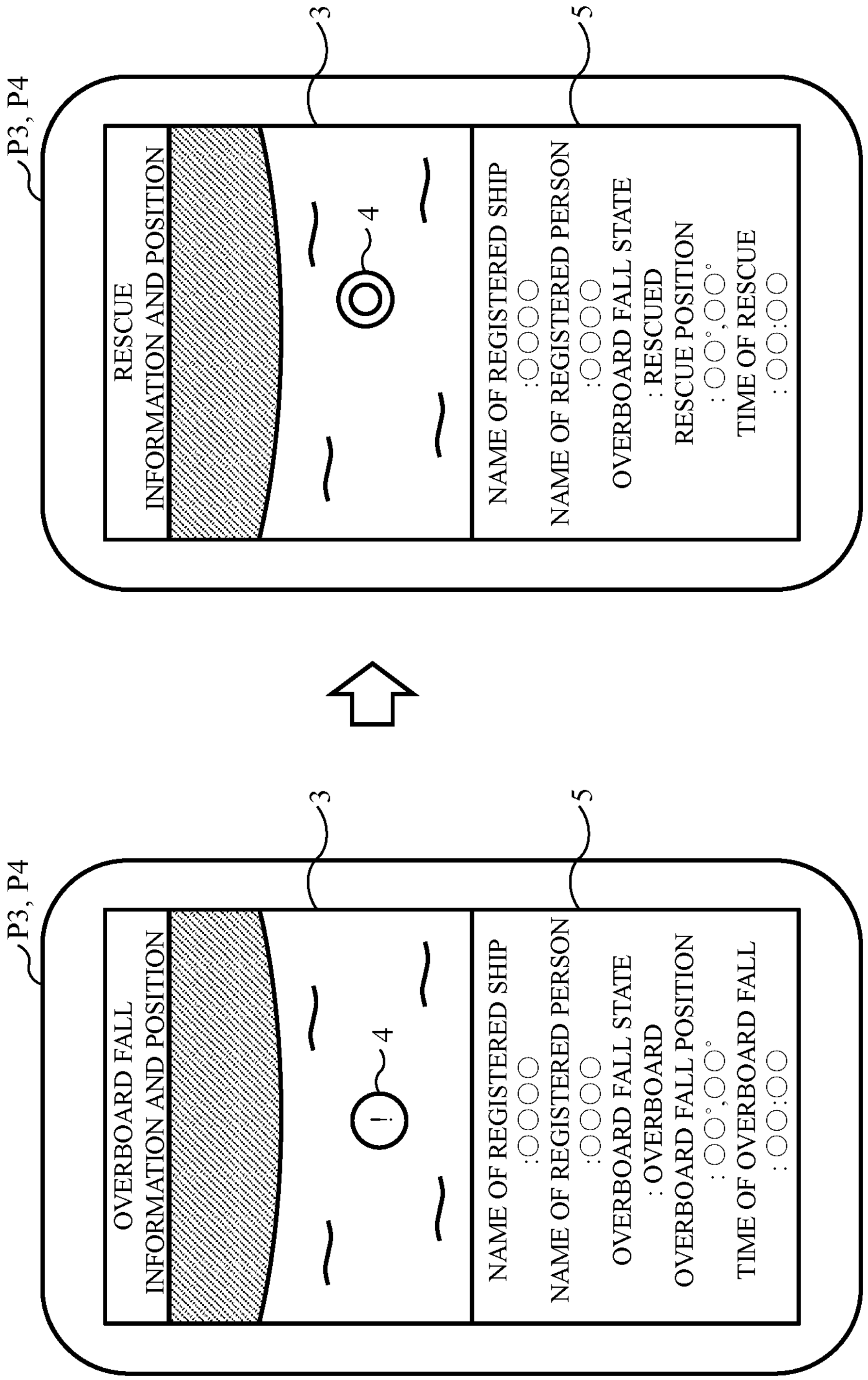
FIG. 11 is a diagram illustrating a process of displaying overboard fall information and rescue information according to the present disclosure.

Next, a step of relaying and notifying of the overboard fall information related to the ship crewperson C and the overboard fall position of the ship crewperson C will be described. A display process according to the present disclosure for displaying the overboard fall information is illustrated in the left column of FIG. 11.

The portable terminals P1 and P2 acquire the overboard fall information related to the ship crewperson C from the overboard fall detection unit U by receiving the beacon signal (step S11). Each of the portable terminals P1 and P2 uses 4G or LTE to relay the overboard fall information related to the ship crewperson C to the cloud server S, and notify the cloud server S of the terminal's own position as the overboard fall position of the ship crewperson C (step S12).

The cloud server S uses 4G or LTE to acquire, from the portable terminals P1 and P2, the overboard fall information related to the ship crewperson C and the overboard fall position of the ship crewperson C (step S13). The cloud server S references the notification destination table and confirms the portable terminals P3 and P4 to which to be relayed the information related to the ship crewperson C (step S14). Furthermore, the cloud server S uses 4G or LTE to relay the overboard fall information related to the ship crewperson C and the overboard fall position of the ship crewperson C to the portable terminals P3 and P4 (step S15).

The portable terminals P3 and P4 use 4G or LTE to acquire, from the cloud server S, the overboard fall information related to the ship crewperson C and the overboard fall position of the ship crewperson C (step S16). The portable terminals P3 and P4 display the overboard fall information related to the ship crewperson C as overboard fall information 5, and display the overboard fall position of the ship crewperson C as an icon 4 of map information 3 (step S17). The overboard fall information 5 includes the name of the registered ship (ship V1), the name of the registered person (ship crewperson C), the overboard fall state (overboard), the overboard fall position (latitude and longitude), the time of overboard fall, and the like.

In this way, via the portable terminals P1 and P2 in the vicinity of the ship crewperson C and the cloud server S, it is possible to relay and notify of the overboard fall information related to the ship crewperson C and the overboard fall position of the ship crewperson C to the portable terminal P4 of the base B or the family H of the ship crewperson C and to the portable terminal P3 of the ship V2 in the vicinity of the ship crewperson C.

Figure 12:
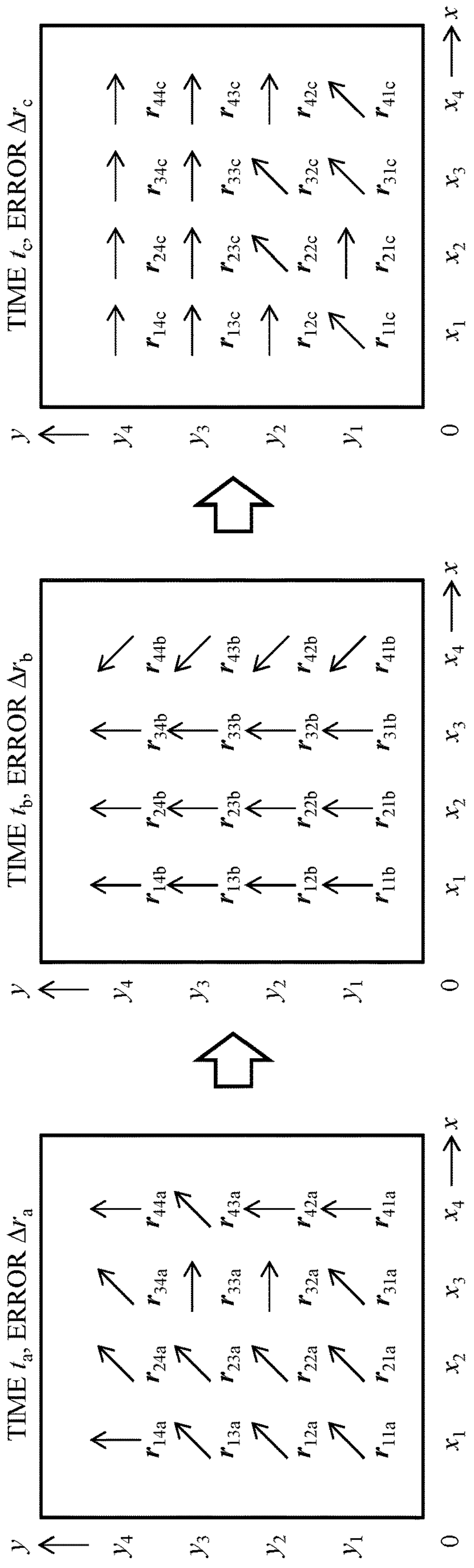
FIG. 12 is a diagram illustrating wind speed or tidal current data according to the present disclosure.
Figure 13:
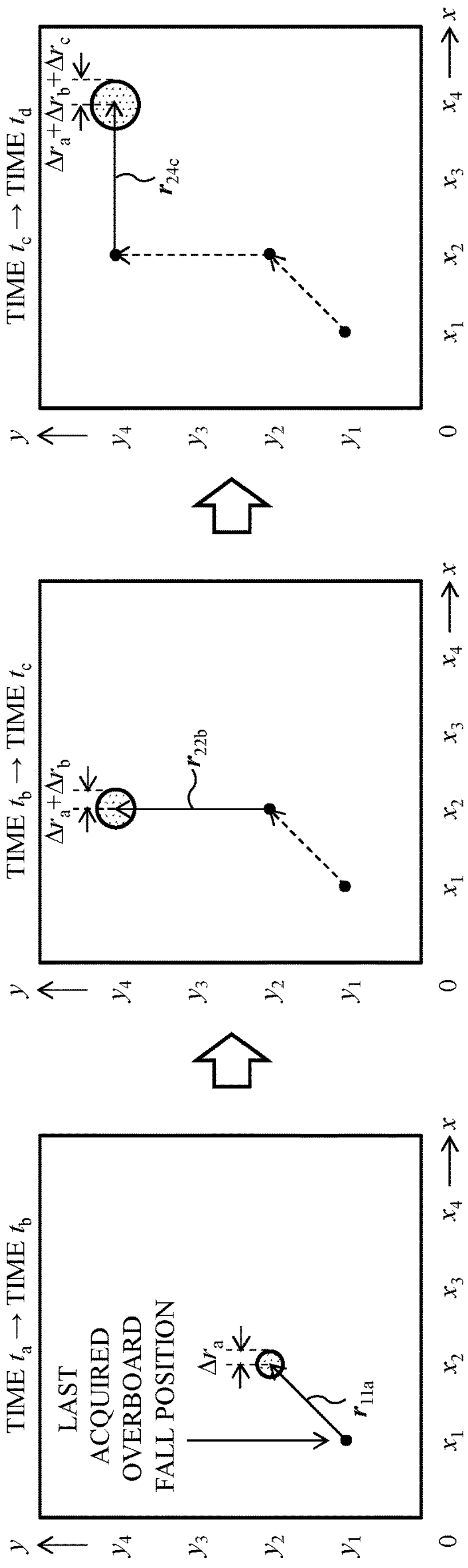
FIG. 13 is a diagram illustrating a process of estimating an overboard fall position according to the present disclosure.

Next, a step of estimating the overboard fall position of ship crewperson C will be described. Wind speed or tidal current data according to the present disclosure is illustrated in FIG. 12. FIG. 13 illustrates a process of estimating the position of the overboard fall according to the present disclosure.

A case where each of the portable terminals P1 and P2 cannot notify the cloud server S of the terminal's own position as the overboard fall position of the ship crewperson C using 4G or LTE will be described below (step S18). This is due to submersion of the portable terminal P1, malfunction of the portable terminal P2, malfunction of the GPS system (Global Positioning Satellite System), or the like.

The cloud server S is not able to acquire the overboard fall position of the ship crewperson C from the portable terminals P1 and P2 using 4G or LTE (step S19). Therefore, the cloud server S estimates the overboard fall position of the ship crewperson C based on the wind speed or tidal current (step S20). The cloud server S references the notification destination table and confirms the portable terminals P3 and P4 to which to be relayed the information related to the ship crewperson C (step S21). Further, the cloud server S uses 4G or LTE to notify the portable terminals P3 and P4 of the overboard fall position of the ship crewperson C estimated in step S20 (step S22).

The portable terminals P3 and P4 uses 4G or LTE to acquire the overboard fall position of the ship crewperson C from the cloud server S (step S23). The portable terminals P3 and P4 display the overboard fall position of the ship crewperson C as the icon 4 of the map information 3 (step S24).

In the wind speed or tidal current data out of the meteorological and oceanographic data illustrated in FIG. 12, the wind speed or tidal current vector $r_{ijk}$ and the wind speed or tidal current error $\Delta r_k$ are included at the time $t_k$ (k=a, b, c, etc.), longitude $x_i$ (i=1, 2, 3, 4, etc.) and latitude $y_j$ (j=1, 2, 3, 4, etc.).

In the process of estimating the overboard fall position of the ship crewperson C illustrated in FIG. 13, the cloud server S can acquire the overboard fall position $(x_1, y_1)$ of the ship crewperson C immediately before time $t_a$, and at the time $t_a$, becomes unable to acquire the overboard fall position of the ship crewperson C, and refers to the wind speed or tidal current data illustrated in FIG. 12.

First, at time $t_a$, longitude $x_1$, and latitude $y_1$, the wind speed or tidal current vector is $r_{11a}$ and the wind speed or tidal current error is $\Delta r_a$. Therefore, the cloud server S estimates that from time $t_a$ to time $t_b$ the overboard fall position of the ship crewperson C moved from latitude and longitude $(x_1, y_1)$ to latitude and longitude $(x_2, y_2)$, acquired by adding vector $r_{11a}$. The cloud server S estimates that the error in the overboard fall position of the ship crewperson C is $\Delta r_a$ at the time $t_b$.

Next, at time $t_b$, longitude $x_2$, and latitude $y_2$, the wind speed or tidal current vector is $r_{22b}$ and the wind speed or tidal current error is $\Delta r_b$. Therefore, the cloud server S estimates that from time $t_b$ to time $t_c$ the overboard fall position of the ship crewperson C moved from latitude and longitude $(x_2, y_2)$ to latitude and longitude $(x_2, y_4)$, acquired by adding vector $r_{22b}$. The cloud server S estimates that the error in the overboard fall position of the ship crewperson C is $\Delta r_a + \Delta r_b$ at time $t_c$.

Next, at time $t_c$, longitude $x_2$, and latitude $y_4$, the wind speed or tidal current vector is $r_{24c}$ and the wind speed or tidal current error is $\Delta r_c$. Therefore, the cloud server S estimates that from time $t_c$ to time $t_d$ the overboard fall position of the ship crewperson C moved from latitude and longitude $(x_2, y_4)$ to latitude and longitude $(x_4, y_4)$, acquired by adding vector $r_{24}$c. The cloud server S estimates that the error in the overboard fall position of the ship crewperson C is $\Delta r_a + \Delta r_b + \Delta r_c$ at time $t_d$.

In this way, even when the process for measuring the position of portable terminals P1 and P2 by the portable terminals P1 and P2 in the vicinity of the ship crewperson C who fell overboard is unsuccessful, the overboard fall position of the ship crewperson C can be relayed and notified of by using a process for estimating the position of the portable terminals P1 and P2 by the cloud server S.

Next, a step of relaying and notifying of rescue information for the ship crewperson C and the rescue position of the ship crewperson C will be described. A process for displaying rescue information according to the present disclosure is illustrated in the right column of FIG. 11.

The overboard fall detection part 21 acquires rescue information for the ship crewperson C based on button operation or the like of the overboard fall detection unit U (step S25). The overboard fall storage part 22 stores the rescue information for the ship crewperson C (step S26). The overboard fall notification part 23 transmits a beacon signal based on the contents stored in the overboard fall storage part 22, thereby notifying the portable terminals P1 and P2 of the rescue information for the ship crewperson C (step S27).

The portable terminals P1 and P2 receive the beacon signal to acquire the rescue information for the ship crewperson C from the overboard fall detection unit U (step S28). The portable terminals P1 and P2 use 4G or LTE to relay the rescue information for the ship crewperson C to the cloud server S, and notify the cloud server S of the terminal's own position as the rescue position of the ship crewperson C (step S29).

The cloud server S uses 4G or LTE to acquire, from the portable terminals P1 and P2, the rescue information for the ship crewperson C and the rescue position of the ship crewperson C (step S30). The cloud server S references the notification destination table and confirms the portable terminals P3 and P4 to which to be relayed the information related to the ship crewperson C (step S31). Furthermore, the cloud server S uses 4G or LTE to relay the rescue information for the ship crewperson C and the rescue position of the ship crewperson C to the portable terminals P3 and P4 (step S32).

The portable terminals P3 and P4 use 4G or LTE to acquire, from the cloud server S, the rescue information for the ship crewperson C and the rescue position of the ship crewperson C (step S33). The portable terminals P3 and P4 display the rescue information for the ship crewperson C as the overboard fall information 5, and display the rescue position of the ship crewperson C as the icon 4 of map information 3 (step S34). The overboard fall information 5 includes the name of the registered ship (ship V1), the name of the registered person (ship crewperson C), the overboard state (rescued), rescue position (latitude and longitude), rescue time, and the like.

In this way, via the portable terminals P1 and P2 in the vicinity of the ship crewperson C and the cloud server S, it is possible to relay and notify of the rescue information for the ship crewperson C and the rescue position of the ship crewperson C to the portable terminal P4 of the base B or the family H of the ship crewperson C and to the portable terminal P3 of the ship V2 in the vicinity of the ship crewperson C.

INDUSTRIAL APPLICABILITY

The overboard fall detection unit, portable terminals, and server device according to the present disclosure are able to relay and notify of overboard fall information related to a ship crewperson and the overboard fall position of the ship crewperson to the base or family of the ship crewperson who has fallen overboard, as well as to ships in the vicinity of the ship crewperson who has fallen overboard.

REFERENCE SIGNS LIST

C: Ship crewperson
R: Wireless tag
P, P1, P2, P3, P4: Portable terminal
F: Overboard fall detection system
V1, V2: Ship
B: Base
H: Home
U: Overboard fall detection unit
S: Cloud server
1: Water environment sensor
2: Overboard fall detection device
3: Map information
4: Icon
5: Overboard fall information
21: Overboard fall detection part
22: Overboard fall storage part
23: Overboard fall notification part

What is claimed is:

1. An overboard fall detection unit comprising:

a water environment sensor equipped on a ship crewperson and configured to output water environment data around the ship crewperson;

an overboard fall detection part configured to detect an overboard fall of the ship crewperson based on the water environment data;

an overboard fall notification part configured to transmit a beacon signal that continuously notifies of overboard fall information related to the ship crewperson via one-way communication; and an overboard fall storage part configured to write the overboard fall information related to the ship crewperson to a memory, and to continuously write the overboard fall information related to the ship crewperson to the memory regardless of whether or not the ship crewperson has resurfaced after the overboard fall, wherein the overboard fall notification part transmits the beacon signal notifying of the overboard fall information related to the ship crewperson based on the overboard fall information related to the ship crewperson that is continuously written to the memory.

2. The overboard fall detection unit according to claim 1, wherein the overboard fall detection part detects the overboard fall of the ship crewperson definitively and not provisionally based on a state of the overboard fall of the ship crewperson being detected continuously for a predetermined time or more.

3. A portable terminal configured to relay and notify of the overboard fall information related to the ship crewperson when the overboard fall information related to the ship crewperson is acquired from the overboard fall detection unit according to claim 1.

4. The portable terminal according to claim 3 configured to notify of the portable terminal's own position as an overboard fall position of the ship crewperson when the overboard fall information related to the ship crewperson is acquired from the overboard fall detection unit.

5. A server device configured to relay and notify a pre-registered terminal of the overboard fall information related to the ship crewperson when the overboard fall information related to the ship crewperson is acquired from the portable terminal according to claim 3.

6. The server device according to claim 5, wherein the portable terminal further notifies of the portable terminal's own position as an overboard fall position of the ship crewperson when the overboard fall information related to the ship crewperson is acquired from the overboard fall detection unit, and the server device relays and notifies the pre-registered terminal of the overboard fall position of the ship crewperson when the overboard fall position of the ship crewperson is acquired from the portable terminal further notifying of the portable terminal's own position, and to notify the pre-registered terminal of the overboard fall position of the ship crewperson estimated based on wind speed or tidal current when the overboard fall position of the ship crewperson is not possible to be acquired from the portable terminal further notifying of the portable terminal's own position.

* * * * *